(12) United States Patent
Zhang et al.

(10) Patent No.: US 10,015,738 B2
(45) Date of Patent: Jul. 3, 2018

(54) METHOD, APPARATUS, AND DEVICE FOR CONTROLLING WIRELESS TRANSMISSION

(71) Applicant: Huawei Technologies Co., Ltd., Shenzhen (CN)

(72) Inventors: Lianbo Zhang, Shenzhen (CN); Xun Yang, Shenzhen (CN); Jing Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 15/055,155

(22) Filed: Feb. 26, 2016

(65) Prior Publication Data
US 2016/0183183 A1 Jun. 23, 2016

Related U.S. Application Data

(63) Continuation of application No. PCT/CN2013/082352, filed on Aug. 27, 2013.

(51) Int. Cl.
*H04L 12/66* (2006.01)
*H04W 48/20* (2009.01)
(Continued)

(52) U.S. Cl.
CPC ....... *H04W 48/20* (2013.01); *H04W 28/0236* (2013.01); *H04W 28/12* (2013.01);
(Continued)

(58) Field of Classification Search
CPC .................................................. H04W 48/20
See application file for complete search history.

(56) References Cited

U.S. PATENT DOCUMENTS 9,749,028 B2 * 8/2017 Suh ...................... H04B 7/0619
9,781,692 B2 * 10/2017 Gou ................... H04W 56/0015
(Continued)

FOREIGN PATENT DOCUMENTS

| CN | 1792108 A | 6/2006 |
|---|---|---|
| CN | 102083126 A | 6/2011 |

(Continued)

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Std 802.11-2007, pp. i-1184, Institute of Electrical and Electronics Engineers, New York, New York (Jun. 12, 2007).

(Continued)

*Primary Examiner* — Gerald A Smarth
(74) *Attorney, Agent, or Firm* — Leydig, Voit & Mayer, Ltd.

(57) ABSTRACT

Embodiments of the disclosure provide a method, an apparatus, and a device for controlling wireless transmission. A first access point in a first system selects, from access point devices in a second system, one access point as a second access point to which the first access point is attached, and connects to the second access point to send first information to a network device. In so doing, the network device determines, according to the first information and second information that is sent by a user device via an access point to which the user device is attached, a transmission mode and a transmission bandwidth between the first access point and the user device, thereby solving a problem of cross timeslot interference that occurs when wireless local area network systems of different types have an overlapping coverage area and are not synchronized.

20 Claims, 8 Drawing Sheets

(51) Int. Cl.
*H04W 28/20* (2009.01)
*H04W 28/02* (2009.01)
*H04W 28/12* (2009.01)
*H04W 48/06* (2009.01)
*H04W 76/04* (2009.01)
*H04W 84/12* (2009.01)
*H04W 88/02* (2009.01)
*H04W 88/08* (2009.01)

(52) U.S. Cl.
CPC ........... *H04W 28/20* (2013.01); *H04W 48/06* (2013.01); *H04W 76/04* (2013.01); *H04W 84/12* (2013.01); *H04W 88/02* (2013.01); *H04W 88/08* (2013.01)

(56) References Cited

U.S. PATENT DOCUMENTS

| | | | |
|---|---|---|---|
| 2002/0089956 A1* | 7/2002 | Haugli | H04B 7/18513 370/335 |
| 2004/0229621 A1 | 11/2004 | Misra | |
| 2007/0230324 A1* | 10/2007 | Li | H04W 72/0406 370/204 |
| 2008/0056174 A1 | 3/2008 | Jung et al. | |
| 2008/0186892 A1* | 8/2008 | Damnjanovic | H04W 52/0216 370/311 |
| 2012/0046025 A1 | 2/2012 | Das et al. | |
| 2013/0279385 A1* | 10/2013 | Meylan | H04W 52/0225 370/311 |
| 2014/0073317 A1* | 3/2014 | Zhou | H04W 28/0205 455/424 |

FOREIGN PATENT DOCUMENTS

| | | |
|---|---|---|
| CN | 102970713 A | 3/2013 |
| CN | 103069885 A | 4/2013 |
| EP | 2106074 A1 | 9/2009 |
| EP | 2797353 A1 | 10/2014 |
| WO | WO 2008091126 A1 | 7/2008 |
| WO | WO 2013107389 A1 | 7/2013 |

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Std 802.11n-2009, pp. i-502, Institute of Electrical and Electronics Engineers, New York, New York (Oct. 29, 2009).

"IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Std 802.11ac-2013, pp. i-395, Institute of Electrical and Electronics Engineers, New York, New York (Dec. 11, 2013).

* cited by examiner

METHOD, APPARATUS, AND DEVICE FOR CONTROLLING WIRELESS TRANSMISSION

CROSS-REFERENCE TO RELATED APPLICATIONS

This application is a continuation of International Patent Application No. PCT/CN2013/082352, filed on Aug. 27, 2013, which is hereby incorporated by reference in its entirety.

TECHNICAL FIELD

Embodiments of the present disclosure relate to the field of communications technologies, and in particular, to a method, an apparatus, and a device for controlling wireless transmission.

BACKGROUND

In a Next Generation WiFi (NGiFi) system, if a synchronous orthogonal frequency division multiple access (OFDMA) technology with centralized scheduling is used, because multiple NGiFi systems run on a non-licensed frequency band, exclusion is not ensured. Therefore, when multiple NGiFi systems that do not belong to a same type coexist and the multiple NGiFi systems are not synchronized, a problem of cross timeslot interference occurs with the coexistence of the multiple NGiFi systems, that is, upstream transmission of one of the NGiFi systems interferes with downstream reception of another NGiFi system, or downstream transmission of one of the NGiFi systems interferes with upstream reception of another NGiFi system, causing a severe reduction in the total system throughput.

SUMMARY

The present disclosure provides a method, an apparatus, and a device for controlling wireless transmission, to resolve the problem of cross timeslot interference that occurs among multiple wireless local area network systems of different types in a scenario in which the multiple wireless local area network systems of different types coexist and the multiple wireless local area network systems of different types are not synchronized, thereby improving a system throughput.

According to a first aspect, a method for controlling wireless transmission is provided, including:

selecting, by a first access point in a first system from access points in a second system, one access point as a second access point to which the first access point is attached, where the first system and the second system have an overlapping coverage area; and connecting, by the first access point, to the second access point, and sending first information to a network device in the second system via the second access point, so that the network device determines, according to the first information and second information that is sent by a user device in the first system, a transmission mode and a transmission bandwidth between the first access point and the user device, where the first information includes channel state information between the first access point and an access point in the second system, and bandwidth requirement information of the first access point; and the second information includes channel state information between the user device and the first access point, channel state information between the user device and an access point in the second system, and bandwidth requirement information of the user device.

Based on the first aspect, in a first possible implementation manner:

the first system is a first-type wireless local area network system, and the second system is a second-type wireless local area network system; and the first-type wireless local area network system is a wireless local area network system without an infrastructure, and the second-type wireless local area network system is a wireless local area network system with an infrastructure.

Based on the first aspect, in a second possible implementation manner, after the connecting, by the first access point, to the second access point, and sending first information to a network device in the second system via the second access point, the method includes:

receiving, by the first access point via the second access point, the transmission mode and the transmission bandwidth sent by the network device, where the transmission mode includes a direct mode or a relay mode; and if the transmission mode is the direct mode, performing, by the first access point, data transmission directly with the user device by using the transmission bandwidth; or if the transmission mode is the relay mode, performing, by the first access point, data transmission with the user device via the second access point and a third access point to which the user device is attached, where the second access point and the third access point are a same access point; or the second access point and the third access point are two different access points.

According to a second aspect, a method for controlling wireless transmission is provided, including:

determining, by a user device in a first system from access points in a second system, a third access point to which the user device is attached, where the first system and the second system have an overlapping coverage area; and connecting, by the user device, to the third access point, and sending second information to a network device in the second system via the third access point, so that the network device determines, according to the second information and first information that is sent by a first access point in the first system, a transmission mode and a transmission bandwidth between the first access point and the user device, where the second information includes channel state information between the user device and the first access point, channel state information between the user device and an access point in the second system, and bandwidth requirement information of the user device; and the first information includes channel state information between the first access point and an access point in the second system, and bandwidth requirement information of the first access point.

Based on the second aspect, in a first possible implementation manner:

the first system is a first-type wireless local area network system, and the second system is a second-type wireless local area network system; and the first-type wireless local area network system is a wireless local area network system without an infrastructure, and the second-type wireless local area network system is a wireless local area network system with an infrastructure.

Based on the second aspect, in a second possible implementation manner, after the connecting, by the user device, to the third access point, and sending second information to a network device in the second system via the third access point, the method includes:

receiving, by the user device via the third access point, the determined transmission mode and transmission bandwidth sent by the network device, where the transmission mode includes a direct mode or a relay mode; and if the transmission mode is the direct mode, performing, by the user device, data transmission directly with the first access point by using the transmission bandwidth; or if the transmission mode is the relay mode, performing, by the user device, data transmission with the first access point via the third access point and a second access point to which the first access point is attached, where the second access point and the third access point are a same access point; or the second access point and the third access point are two different access points.

According to a third aspect, a method for controlling wireless transmission is provided, including:

receiving, by a network device in a second system, first information sent by a first access point in a first system, where the first information includes channel state information between the first access point and an access point in the second system, and bandwidth requirement information of the first access point, and the first system and the second system have an overlapping coverage area;

receiving, by the network device, second information sent by a user device in the first system, where the second information includes channel state information between the first access point and the user device, channel state information between an access point in the second system and the user device, and bandwidth requirement information of the user device; and determining, by the network device, a transmission mode and a transmission bandwidth between the first access point and the user device according to the first information and the second information.

Based on the third aspect, in a first possible implementation manner, the receiving, by a network device in a second system, first information sent by a first access point in a first system includes:

receiving, by the network device via a second access point device in the second system, the first information sent by the first access point, where the second access point is an access point, to which the first access point is attached, selected by the first access point from access points in the second system.

Based on the third aspect, in a second possible implementation manner, the receiving, by the network device, second information sent by a user device in the first system includes:

receiving, by the network device via a third access point device in the second system, the second information sent by the user device, where the third access point is an access point, to which the user device is attached, selected by the user device from access points in the second system.

Based on the third aspect, or the first or the second possible implementation manner of the third aspect, in a third possible implementation manner:

the first system is a first-type wireless local area network system, and the second system is a second-type wireless local area network system; and the first-type wireless local area network system is a wireless local area network system without an infrastructure, and the second-type wireless local area network system is a wireless local area network system with an infrastructure.

Based on the third aspect, or the first or the second possible implementation manner of the third aspect, in a fourth possible implementation manner, the determining, by the network device, a transmission mode and a transmission bandwidth between the first access point and the user device according to the first information and the second information includes:

determining, by the network device, the transmission bandwidth between the first access point and the user device according to the first information and the second information;

according to the transmission bandwidth between the first access point and the user device, determining a bandwidth occupied by the first access point in an access point in the second system and an isolation bandwidth, and determining a bandwidth occupied by the user device in an access point in the second system and an isolation bandwidth; and determining the transmission mode between the first access point and the user device according to the bandwidth occupied by the first access point in an access point in the second system and the isolation bandwidth, and the bandwidth occupied by the user device in an access point in the second system and the isolation bandwidth, where the transmission mode includes a direct mode or a relay mode.

Based on the fourth possible implementation manner of the third aspect, in a fifth possible implementation manner, the determining the transmission mode between the first access point and the user device according to the bandwidth occupied by the first access point in an access point in the second system and the isolation bandwidth, and the bandwidth occupied by the user device in an access point in the second system and the isolation bandwidth may include:

determining, by the network device, a first factor according to the transmission bandwidth between the first access point and the user device, the bandwidth occupied by the first access point in an access point in the second system and the isolation bandwidth, the bandwidth occupied by the user device in an access point in the second system=and the isolation bandwidth, and a modulation and coding scheme between the first access point and the user device for the direct mode, where the first factor is a weighting factor of channel quality and spectral efficiency between the first access point and the user device for the direct mode;

determining, by the network device, a second factor according to the transmission bandwidth between the first access point and the user device, a modulation and coding scheme between the first access point and the second access point for the relay mode, and a modulation and coding scheme between the user device and the third access point for the relay mode, where the second factor is a weighting factor of channel quality and spectral efficiency between the first access point and the user device for the relay mode; and if the first factor is greater than the second factor, determining that the transmission mode between the first access point and the user device is the direct mode; or if the first factor is less than or equal to the second factor, determining that the transmission mode between the first access point and the user device is the relay mode.

Based on the fourth or the fifth possible implementation manner of the third aspect, in a sixth possible implementation manner, after the determining, by the network device, a transmission mode and a transmission bandwidth between the first access point and the user device according to the first information and the second information, the method includes:

sending, by the network device, the determined transmission mode and transmission bandwidth to the first access point via the second access point, and sending, by the network device, the determined transmission mode and transmission bandwidth to the user device via the third access point, so that the first access point and the user device perform data transmission by using the determined transmission mode and transmission bandwidth, where the second access point and the third access point are a same access point; or the second access point and the third access point are two different access points.

According to a fourth aspect, an apparatus for controlling wireless transmission is provided, which is located on a first access point of a first system, and the apparatus includes:

a determining module, configured to select, from access points in a second system, one access point as a second access point to which the first access point is attached, where the first system and the second system have an overlapping coverage area; and a sending module, configured to connect to the second access point, and send first information to a network device in the second system via the second access point, so that the network device determines, according to the first information and second information that is sent by a user device in the first system, a transmission mode and a transmission bandwidth between the first access point and the user device, where the first information includes channel state information between the first access point and an access point in the second system, and bandwidth requirement information of the first access point; and the second information includes channel state information between the user device and the first access point, channel state information between the user device and an access point in the second system, and bandwidth requirement information of the user device.

Based on the fourth aspect, in a first possible implementation manner:

the first system is a first-type wireless local area network system, and the second system is a second-type wireless local area network system; and the first-type wireless local area network system is a wireless local area network system without an infrastructure, and the second-type wireless local area network system is a wireless local area network system with an infrastructure.

Based on the fourth aspect, in a second possible implementation manner, the apparatus further includes:

a receiving module, configured to receive, via the second access point, the transmission mode and the transmission bandwidth sent by the network device, where the transmission mode includes a direct mode or a relay mode; and if the transmission mode is the direct mode, the sending module is configured to perform data transmission directly with the user device by using the transmission bandwidth; or if the transmission mode is the relay mode, the sending module is configured to perform data transmission with the user device via the second access point and a third access point to which the user device is attached, where the second access point and the third access point are a same access point; or the second access point and the third access point are two different access points.

According to a fifth aspect, an apparatus for controlling wireless transmission is provided, which is located on a user device of a first system, and the apparatus includes:

a determining module, configured to select, from access points in a second system, one access point as a third access point to which the user device is attached, where the first system and the second system have an overlapping coverage area; and a sending module, configured to connect to the third access point, and send second information to a network device in the second system via the third access point, so that the network device determines, according to the second information and first information that is sent by a first access point in the first system, a transmission mode and a transmission bandwidth between the first access point and the user device, where the second information includes channel state information between the user device and the first access point, channel state information between the user device and an access point in the second system, and bandwidth requirement information of the user device; and the first information includes channel state information between the first access point and an access point in the second system, and bandwidth requirement information of the first access point.

Based on the fifth aspect, in a first possible implementation manner:

the first system is a first-type wireless local area network system, and the second system is a second-type wireless local area network system; and the first-type wireless local area network system is a wireless local area network system without an infrastructure, and the second-type wireless local area network system is a wireless local area network system with an infrastructure.

Based on the fifth aspect, in a second possible implementation manner, the apparatus further includes:

a receiving module, configured to receive, via the third access point, the determined transmission mode and transmission bandwidth sent by the network device, where the transmission mode includes a direct mode or a relay mode; and if the transmission mode is the direct mode, the sending module is configured to perform data transmission directly with the first access point by using the transmission bandwidth; or if the transmission mode is the relay mode, the sending module is configured to perform data transmission with the first access point via the third access point and a second access point to which the first access point is attached, where the second access point and the third access point are a same access point; or the second access point and the third access point are two different access points.

According to a sixth aspect, an apparatus for controlling wireless transmission is provided, which is located on a network device of a second system, and the apparatus includes:

a receiving module, configured to receive first information sent by a first access point in a first system, where the first information includes channel state information between the first access point and an access point in the second system, and bandwidth requirement information of the first access point, and the first system and the second system have an overlapping coverage area;

the receiving module being further configured to receive second information sent by a user device in the first system, where the second information includes channel state information between the first access point and the user device, channel state information between an access point in the second system and the user device, and bandwidth requirement information of the user device; and a determining module, configured to determine a transmission mode and a transmission bandwidth between the first access point and the user device according to the first information and the second information.

Based on the sixth aspect, in a first possible implementation manner, the receiving module is configured to receive, via a second access point device in the second system, the first information sent by the first access point, where the second access point is an access point, to which the first access point is attached, selected by the first access point from access points in the second system.

Based on the sixth aspect, in a second possible implementation manner, the receiving module is configured to receive, via a third access point device in the second system, the second information sent by the user device, where the third access point is an access point, to which the user device is attached, selected by the user device from access points in the second system.

Based on the sixth aspect, or the first or the second possible implementation manner of the sixth aspect, in a third possible implementation manner:

the first system is a first-type wireless local area network system, and the second system is a second-type wireless local area network system; and the first-type wireless local area network system is a wireless local area network system without an infrastructure, and the second-type wireless local area network system is a wireless local area network system with an infrastructure.

Based on the sixth aspect, or the first or the second possible implementation manner of the sixth aspect, in a fourth possible implementation manner, the determining module is configured to:

determine the transmission bandwidth between the first access point and the user device according to the first information and the second information;

according to the transmission bandwidth between the first access point and the user device, determine a bandwidth occupied by the first access point in an access point in the second system and an isolation bandwidth, and determine a bandwidth occupied by the user device in an access point device in the second system and an isolation bandwidth; and determine the transmission mode between the first access point and the user device according to the bandwidth occupied by the first access point in an access point in the second system and the isolation bandwidth, and the bandwidth occupied by the user device in an access point in the second system and the isolation bandwidth, where the transmission mode includes a direct mode or a relay mode.

Based on the fourth possible implementation manner of the sixth aspect, in a fifth possible implementation manner, the apparatus further includes:

a sending module, configured to send the determined transmission mode and transmission bandwidth to the first access point via the second access point, and send the determined transmission mode and transmission bandwidth to the user device via the third access point, so that the first access point and the user device perform data transmission by using the determined transmission mode and transmission bandwidth, where the second access point and the third access point are a same access point; or the second access point and the third access point are two different access points.

According to a seventh aspect, a first access point is provided, which is located in a first system, and the first access point includes:

a processor, configured to select, from access points in a second system, one access point as a second access point to which the first access point is attached, where the first system and the second system have an overlapping coverage area; and a transceiver, configured to connect to the second access point, and send first information to a network device in the second system via the second access point, so that the network device determines, according to the first information and second information that is sent by a user device in the first system, a transmission mode and a transmission bandwidth between the first access point and the user device, where the first information includes channel state information between the first access point and an access point in the second system, and bandwidth requirement information of the first access point; and the second information includes channel state information between the user device and the first access point, channel state information between the user device and an access point in the second system, and bandwidth requirement information of the user device.

Based on the seventh aspect, in a first possible implementation manner:

the first system is a first-type wireless local area network system, and the second system is a second-type wireless local area network system; and the first-type wireless local area network system is a wireless local area network system without an infrastructure, and the second-type wireless local area network system is a wireless local area network system with an infrastructure.

Based on the seventh aspect, in a second possible implementation manner:

the transceiver is further configured to receive, via the second access point, the transmission mode and the transmission bandwidth sent by the network device, where the transmission mode includes a direct mode or a relay mode; and if the transmission mode is the direct mode, the transceiver is configured to perform data transmission directly with the user device by using the transmission bandwidth; or if the transmission mode is the relay mode, the transceiver is configured to perform data transmission with the user device via the second access point and a third access point to which the user device is attached, where the second access point and the third access point are a same access point; or the second access point and the third access point are two different access points.

According to an eighth aspect, a user device is provided, which is located in a first system, and the user device includes:

a processor, configured to select, from access points in a second system, one access point as a third access point to which the user device is attached, where the first system and the second system have an overlapping coverage area; and a radio frequency transmitter, configured to connect to the third access point, and send second information to a network device in the second system via the third access point, so that the network device determines, according to the second information and first information that is sent by a first access point in the first system, a transmission mode and a transmission bandwidth between the first access point and the user device, where the second information includes channel state information between the user device and the first access point, channel state information between the user device and an access point in the second system, and bandwidth requirement information of the user device; and the first information includes channel state information between the first access point and an access point in the second system, and bandwidth requirement information of the first access point.

Based on the eighth aspect, in a first possible implementation manner:

the first system is a first-type wireless local area network system, and the second system is a second-type wireless local area network system; and the first-type wireless local area network system is a wireless local area network system without an infrastructure, and the second-type wireless local area network system is a wireless local area network system with an infrastructure.

Based on the eighth aspect, in a second possible implementation manner:

the radio frequency transmitter is further configured to receive, via the third access point, the determined transmission mode and transmission bandwidth sent by the network device, where the transmission mode includes a direct mode or a relay mode; and if the transmission mode is the direct mode, the radio frequency transmitter is configured to perform data transmission directly with the first access point by using the transmission bandwidth; or if the transmission mode is the relay mode, the radio frequency transmitter is configured to perform data transmission with the first access point via the third access point and a second access point to which the first access point is attached, where the second access point and the third access point are a same access point; or the second access point and the third access point are two different access points.

According to a ninth aspect, a network device is provided, which is located in a second system, and the network device includes:

a transceiver, configured to receive first information sent by a first access point in a first system, where the first information includes channel state information between the first access point and an access point in the second system, and bandwidth requirement information of the first access point, and the first system and the second system have an overlapping coverage area;

the transceiver being further configured to receive second information sent by a user device in the first system, where the second information includes channel state information between the first access point and the user device, channel state information between an access point in the second system and the user device, and bandwidth requirement information of the user device; and a processor, configured to determine a transmission mode and a transmission bandwidth between the first access point and the user device according to the first information and the second information.

Based on the ninth aspect, in a first possible implementation manner, the transceiver is configured to receive, via a second access point device in the second system, the first information sent by the first access point, where the second access point is an access point, to which the first access point is attached, selected by the first access point from access points in the second system.

Based on the ninth aspect, in a second possible implementation manner, the transceiver is configured to receive, via a third access point device in the second system, the second information sent by the user device, where the third access point is an access point, to which the user device is attached, selected by the user device from access points in the second system.

Based on the ninth aspect, or the first or the second possible implementation manner of the ninth aspect, in a third possible implementation manner:

the first system is a first-type wireless local area network system, and the second system is a second-type wireless local area network system; and the first-type wireless local area network system is a wireless local area network system without an infrastructure, and the second-type wireless local area network system is a wireless local area network system with an infrastructure.

Based on the ninth aspect, or the first or the second possible implementation manner of the ninth aspect, in a fourth possible implementation manner, the processor is configured to:

determine the transmission bandwidth between the first access point and the user device according to the first information and the second information;

according to the transmission bandwidth between the first access point and the user device, determine a bandwidth occupied by the first access point in an access point in the second system and an isolation bandwidth, and determine a bandwidth occupied by the user device in an access point in the second system and an isolation bandwidth; and determine the transmission mode between the first access point and the user device according to the bandwidth occupied by the first access point in an access point in the second system and the isolation bandwidth, and the bandwidth occupied by the user device in an access point in the second system and the isolation bandwidth, where the transmission mode includes a direct mode or a relay mode.

Based on the fourth possible implementation manner of the ninth aspect, in a fifth possible implementation manner, the transceiver is further configured to send the determined transmission mode and transmission bandwidth to the first access point via the second access point, and send the determined transmission mode and transmission bandwidth to the user device via the third access point, so that the first access point and the user device perform data transmission by using the determined transmission mode and transmission bandwidth, where the second access point and the third access point are a same access point; or the second access point and the third access point are two different access points.

In the present disclosure, when a first system and a second system are wireless local area network systems of different types, and the first system and the second system have an overlapping coverage area, a first access point in the first system selects, from access point devices in the second system, one access point as a second access point to which the first access point is attached, and connects to the second access point in a synchronized manner to send first information to a network device in the second system. In this way, it can be achieved that the first system is managed by the second system, so that the first system and the second system can be synchronized. Further, the network device in the second system may be used to determine, according to the first information and second information that is sent by a user device in the first system via an access point to which the user device is attached, a transmission mode and a transmission bandwidth between the first access point and the user device. So that the first access point performs data transmission with the user device by using the determined transmission mode and the transmission bandwidth, thereby improving the efficiency of network resource utilization and a system throughput when wireless local area network systems of different types coexist, and also resolving the problem of cross timeslot interference that occurs when wireless local area network systems of different types coexist.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

The technical solutions of embodiments of the present disclosure are applied to a scenario in which there are wireless local area network systems (for example, NGiFi systems) of different types and the wireless local area network systems of different types have an overlapping coverage area.

The first access point and user device in the embodiments of the present disclosure are located in a first system, and the first system is a first-type wireless local area network system, and may refer to a wireless local area network system without an infrastructure.

The network device, second access point, and third access point in the embodiments of the present disclosure are located in a second system, and the second system is a second-type wireless local area network system, and may refer to a wireless local area network system with an infrastructure.

The first system and second system in the embodiments of the present disclosure have an overlapping coverage area.

It should be noted that the network device in the embodiments of the present disclosure includes, but is not limited to, an access controller (AC) or a wireless access point (AP).

The second access point and the third access point in the embodiments of the present disclosure may be a same access point, or may be different access points.

The infrastructure in the embodiments of the present disclosure includes, for example, an infrastructure such as a network backhaul, an AC, a network manager, a local server, or a judgment server.

Figure 1:
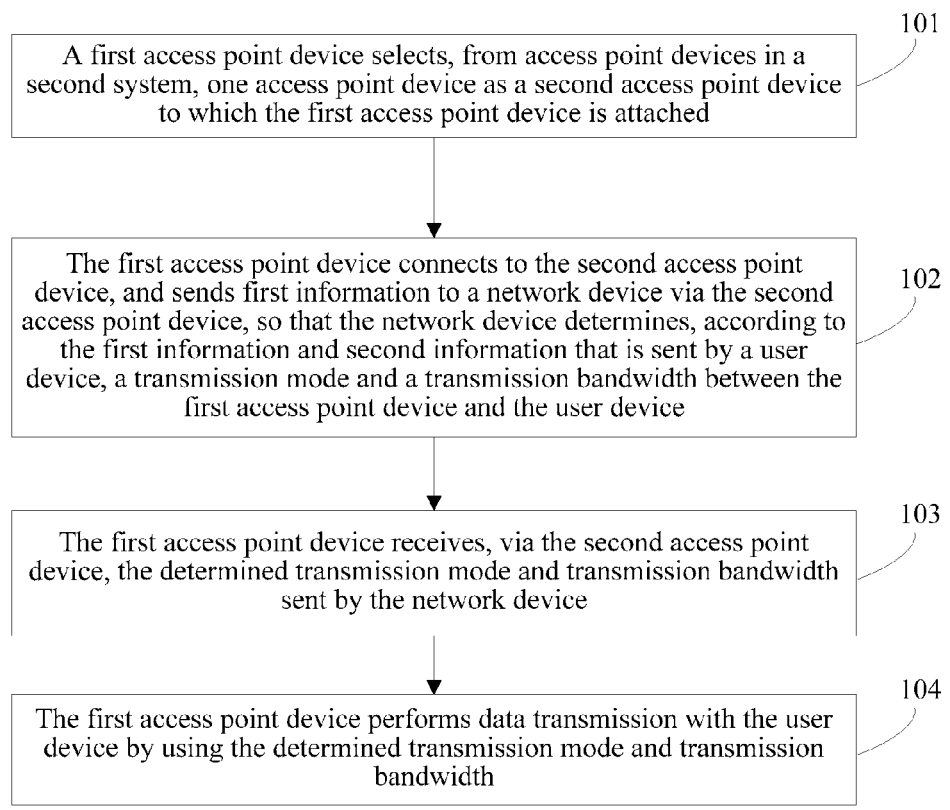
FIG. 1 is a schematic flowchart of a method for controlling wireless transmission according to an embodiment of the present disclosure.

FIG. 1 is a schematic flowchart of a method for controlling wireless transmission according to an embodiment of the present disclosure. As shown in FIG. 1, the method for controlling wireless transmission in this embodiment may include:

101: A first access point selects, from access point devices in a second system, one access point as a second access point to which the first access point is attached.

Because a first system to which the first access point belongs has no other infrastructure, when the first system and the second system have an overlapping coverage area and are not synchronized, a problem of cross timeslot interference between the first system and the second system is encountered. That is, upstream transmission of the first system interferes with downstream reception of the second system, or downstream transmission of the first system interferes with upstream reception of the second system, thereby causing a severe reduction in the total system throughput.

To resolve the problem of cross timeslot interference that occurs when wireless local area network systems of different types have an overlapping coverage area and are not synchronized, and to improve the total system throughput, in this embodiment, the first system is managed by the second system. Since the second system has a complete infrastructure, resources can be coordinated and used via a network device (for example, an AC) of the second system, thereby avoiding or eliminating the problem of cross timeslot interference that occurs when wireless local area network systems of different types have an overlapping coverage area and are not synchronized.

For example, during an implementation of step 101:

Assuming that the second system includes multiple access points, the first access point may select, from the access point devices in the second system according to at least one of channel state information such as channel quality and path loss/channel utilization rate between the first access point and an access point device in the second system, one access point as an access point to which the first access point is attached. For example, an access point having the best channel quality with the first access point is used as the access point to which the first access point is attached. In this embodiment, for convenience of description, the access point to which the first access point is attached is referred to as the second access point.

102: The first access point connects to the second access point, and sends first information to a network device via the second access point, so that the network device determines, according to the first information and second information that is sent by a user device, a transmission mode and a transmission bandwidth between the first access point and the user device.

Because the first system to which the first access point belongs coexists with the second system, the first access point may measure channel state information between the first access point and each access point device in the second system separately, where the channel state information includes, for example, information such as channel quality information and path loss/channel utilization rate.

After the access point to which the first access point is attached (the second access point) is determined in step 101, the first access point may connect to the second access point in a synchronized manner to implement synchronization between the first system and the second system. Then, the first access point sends, to the network device in the second system via the second access point, the measured channel state information between the first access point and each access point device in the second system, and bandwidth requirement information of the first access point. In this embodiment, for convenience of description, channel state information between the first access point and an access point device in the second system and the bandwidth requirement information of the first access point are referred to as the first information.

The second information in this embodiment includes channel state information between the user device and the first access point, channel state information between each access point device in the second system and the user device, and bandwidth requirement information of the user device. For details, reference may be made to related description in the embodiment shown in FIG. 2 below.

For an example of determining, by the network device according to the first information and the second information that is sent by the user device, the transmission mode and the transmission bandwidth between the first access point and the user device, reference may be made to related description in the embodiment shown in FIG. 3 below.

103: The first access point receives, via the second access point, the determined transmission mode and transmission bandwidth sent by the network device.

The transmission mode includes a direct mode or a relay mode.

104: The first access point performs data transmission with the user device by using the determined transmission mode and transmission bandwidth.

If the transmission mode is the direct mode, the first access point performs data transmission directly with the user device by using the transmission bandwidth; or if the transmission mode is the relay mode, the first access point performs data transmission with the user device via the second access point and a third access point to which the user device is attached.

The second access point and the third access point may be the same access point or different access points.

In this embodiment of the present disclosure, when a first system and a second system are wireless local area network systems of different types, and the first system and the second system have an overlapping coverage area and are not synchronized, a first access point in the first system selects, from access point devices in the second system, one access point as a second access point to which the first access point is attached, and connects to the second access point in a synchronized manner to send first information to a network device in the second system. In this way, it can be achieved that the first system is managed by the second system, so that the first system and the second system can be synchronized. Further, the network device in the second system may be used to determine, according to the first information and second information that is sent by a user device in the first system via an access point to which the user device is attached, a transmission mode and a transmission bandwidth between the first access point and the user device, so that the first access point performs data transmission with the user device by using the transmission mode and the transmission bandwidth that are determined by the network device, thereby improving the efficiency of network resource utilization and a system throughput when wireless local area network systems of different types coexist, and also resolving the problem of cross timeslot interference that occurs when wireless local area network systems of different types coexist.

Figure 2:
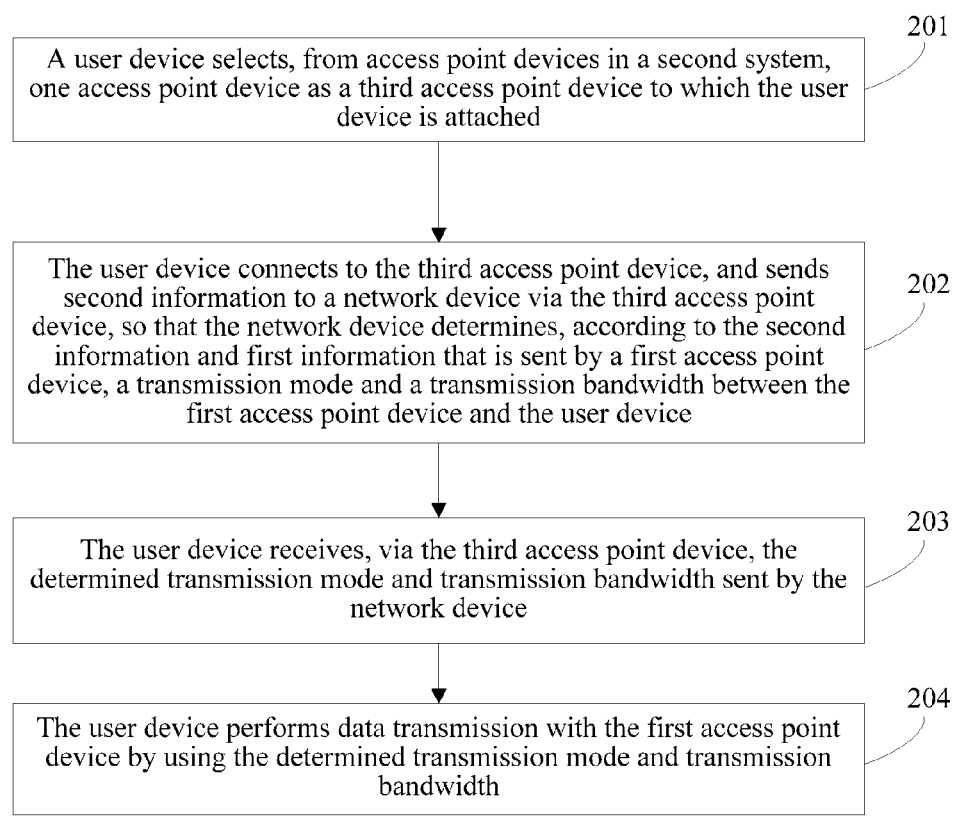
FIG. 2 is a schematic flowchart of a method for controlling wireless transmission according to another embodiment of the present disclosure.

FIG. 2 is a schematic flowchart of a method for controlling wireless transmission according to another embodiment of the present disclosure. As shown in FIG. 2, the method for controlling wireless transmission in this embodiment may include:

201: A user device selects, from access point devices in a second system, one access point as a third access point to which the user device is attached.

Because a first system to which the user device belongs has no other infrastructure, when the first system and the second system have an overlapping coverage area and are not synchronized, a problem of cross timeslot interference between the first system and the second system is encountered.

To resolve the problem of cross timeslot interference that occurs when wireless local area network systems of different types have an overlapping coverage area and are not synchronized, and to improve the total system throughput, in this embodiment, the first system is managed by the second system. Since the second system has a complete infrastructure, resources may be coordinated and used via a network device (for example, an AC) of the second system, thereby avoiding or eliminating the problem of cross timeslot interference that occurs when wireless local area network systems of different types have an overlapping coverage area and are not synchronized.

For example, during an implementation of step 201:

Assuming that the second system includes multiple access points, the user device may select, from the access point devices in the second system according to at least one of channel state information such as channel quality and path loss/channel utilization rate between the user device and each access point device in the second system, one access point as an access point to which the user device is attached. For example, an access point having the best channel quality with the user device is used as the access point to which the user device is attached. In this embodiment, for convenience of description, the access point to which the user device is attached is referred to as the third access point.

It should be noted that, in this embodiment, the access point to which the user device is attached (the third access point) and an access point to which a first access point is attached (a second access point) may be the same access point or may be different access points.

202: The user device connects to the third access point, and sends second information to a network device via the third access point, so that the network device determines, according to the second information and first information that is sent by a first access point, a transmission mode and a transmission bandwidth between the first access point and the user device.

Because the first system to which the user device belongs and the second system have an overlapping coverage area, the user device may measure channel state information between the user device and each access point device in the second system separately, where the channel state information includes, for example, information such as channel quality information and path loss/channel utilization rate.

When the access point to which the user device is attached (the third access point) is determined in step 201, the user device may connect to the third access point in a synchronized manner to implement synchronization between the first system and the second system. Then, the user device sends, to the network device in the second system via the third access point, the measured channel state information between the user device and each access point device in the second system, bandwidth requirement information of the user device, and channel state information between the user device and the first access point. In this embodiment, for convenience of description, the channel state information between the user device and each access point device in the second system, the channel state information between the user device and the first access point, and the bandwidth requirement information of the user device are referred to as the second information.

The first information in this embodiment includes channel state information between the first access point and an access point device in the second system, and bandwidth requirement information of the first access point. For details, reference may be made to related description in the embodiment shown in FIG. 1.

For an example of determining, by the network device according to the second information and the first information that is sent by the first access point, the transmission mode and the transmission bandwidth between the first access point and the user device, reference may be made to related description in the embodiment shown in FIG. 3 below.

203: The user device receives, via the third access point, the determined transmission mode and transmission bandwidth sent by the network device.

The transmission mode includes a direct mode or a relay mode.

204: The user device performs data transmission with the first access point by using the determined transmission mode and transmission bandwidth.

If the transmission mode is the direct mode, the user device performs data transmission directly with the first access point by using the transmission bandwidth; or if the transmission mode is the relay mode, the user device performs data transmission with the first access point via the third access point and a second access point to which the first access point is attached.

In this embodiment of the present disclosure, when a first system and a second system are wireless local area network systems of different types, and the first system and the second system have an overlapping coverage area and are not synchronized, a user device in the first system selects, from access point devices in the second system, one access point as a third access point to which the user device is attached, and connects to the third access point in a synchronized manner to send second information to a network device in the second system. In this way, it can be achieved that the first system is managed by the second system, so that the first system and the second system can be synchronized. Further, the network device in the second system may be used to determine, according to the second information and first information that is sent by a first access point in the first system via an access point to which the first access point is attached, a transmission mode and a transmission bandwidth between the first access point and the user device, so that the user device performs data transmission with the first access point by using the transmission mode and the transmission bandwidth that are determined by the network device, thereby improving the efficiency of network resource utilization and a system throughput when wireless local area network systems of different types coexist, and also resolving the problem of cross timeslot interference that occurs when wireless local area network systems of different types coexist.

Figure 3:
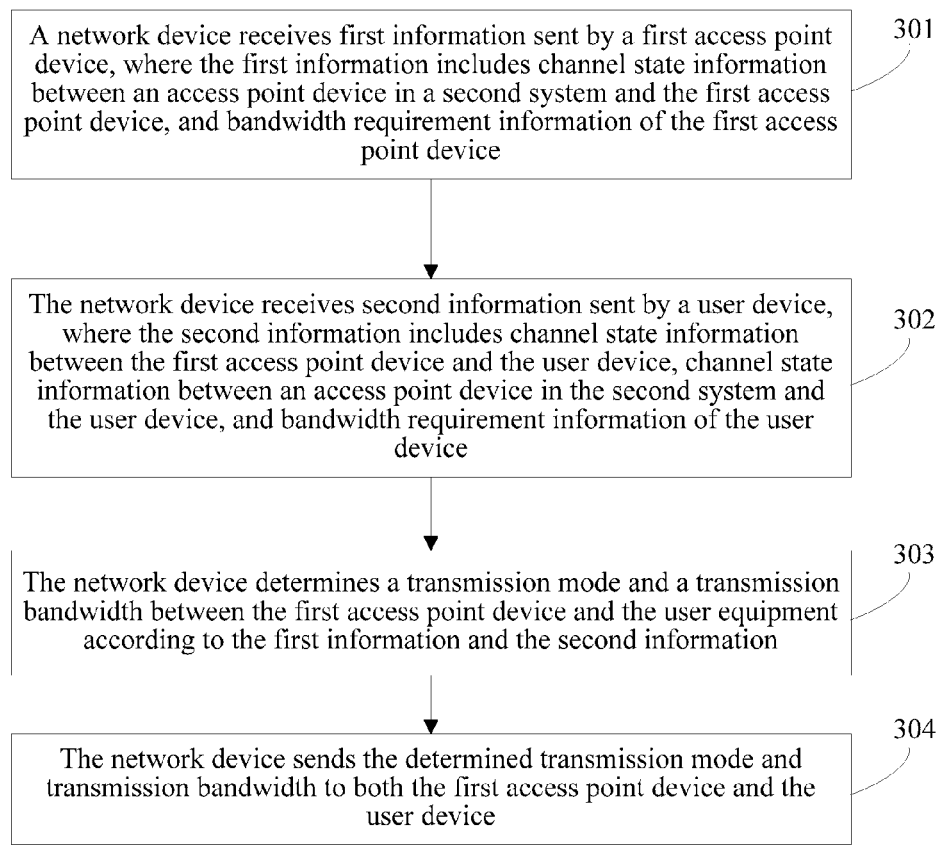
FIG. 3 is a schematic flowchart of a method for controlling wireless transmission according to another embodiment of the present disclosure.

FIG. 3 is a schematic flowchart of a method for controlling wireless transmission according to another embodiment of the present disclosure. As shown in FIG. 3, the method for controlling wireless transmission in this embodiment may include:

301: A network device receives first information sent by a first access point, where the first information includes channel state information between an access point device in a second system and the first access point, and bandwidth requirement information of the first access point.

In an optional implementation manner of the present disclosure, step 301 includes: the network device receives, via a second access point, the first information sent by the first access point.

The second access point is one access point, to which the first access point is attached, selected by the first access point from access points in the second system.

It should be noted that, for implementation of step 301, reference may be made to related description in the embodiment shown in FIG. 1.

302: The network device receives second information sent by a user device, where the second information includes channel state information between the first access point and the user device, channel state information between an access point device in the second system and the user device, and bandwidth requirement information of the user device.

In an optional implementation manner of the present disclosure, step 302 includes: the network device receives, via a third access point, the second information sent by the user device.

The third access point is one access point, to which the user device is attached, selected by the user device from access points in the second system.

It should be noted that, for implementation of step 302, reference may be made to related description in the embodiment shown in FIG. 2.

The second access point and the third access point may be the same access point or may be different access points.

303: The network device determines a transmission mode and a transmission bandwidth between the first access point and the user device according to the first information and the second information.

In an optional implementation manner of the present disclosure, implementation of step 303 includes:

The network device determines the transmission bandwidth between the first access point and the user device according to the first information and the second information. In an actual application, when the network device determines the transmission bandwidth between the first access point and the user device, a network load status may be considered. For example, the network device determines a value of a remaining system bandwidth according to a network load status of the access point in the second system.

Then, according to the channel state information between an access point device in the second system and the first access point and the bandwidth requirement information of the first access point that are included in the first information, the channel state information between the first access point and the user device, the channel state information between an access point device in the second system and the user device, and the bandwidth requirement information of the user device that are included in the second information, if the remaining system bandwidth can satisfy bandwidth requirements of the first access point and the user device, the network device directly allocates the remaining bandwidth according to the bandwidth requirement information of the first access point and the bandwidth requirement information of the user device, so as to determine the transmission bandwidth between the first access point and the user device. Otherwise, the network device allocates the remaining bandwidth in proportion to the first access point and the user device, so as to determine the transmission bandwidth between the first access point and the user device.

Then, according to the transmission bandwidth between the first access point and the user device, the network device determines a bandwidth occupied by the first access point in an access point in the second system and an isolation bandwidth, and determines a bandwidth occupied by the user device in an access point in the second system and an isolation bandwidth.

The network device determines the transmission mode between the first access point and the user device according to the bandwidth occupied by the first access point in an access point in the second system and the isolation bandwidth, and the bandwidth occupied by the user device in an access point in the second system and the isolation bandwidth, where the transmission mode includes a direct mode or a relay mode. In an example implementation, the network device determines a first factor according to the transmission bandwidth between the first access point and the user device, the bandwidth occupied by the first access point in an access point in the second system and the isolation bandwidth, the bandwidth occupied by the user device in an access point in the second system and the isolation bandwidth, and a modulation and coding scheme between the first access point and the user device for the direct mode. The first factor is a weighting factor of channel quality and spectral efficiency between the first access point and the user device for the direct mode. The network device then determines a second factor according to the transmission bandwidth between the first access point and the user device, a modulation and coding scheme between the first access point and the second access point for the relay mode, and a modulation and coding scheme between the user device and the third access point for the relay mode. The second factor is a weighting factor of channel quality and spectral efficiency between the first access point and the user device for the relay mode. If the first factor is greater than the second factor, it is determined that the transmission mode between the first access point and the user device is the direct mode. If the first factor is less than or equal to the second factor, it is determined that the transmission mode between the first access point and the user device is the relay mode.

304: The network device sends the determined transmission mode and transmission bandwidth to both the first access point and the user device.

The network device sends the determined transmission mode and transmission bandwidth to the first access point via the second access point, and sends the determined transmission mode and transmission bandwidth to the user device via the third access point, so that the first access point and the user device perform data transmission by using the determined transmission mode and transmission bandwidth.

In this embodiment of the present disclosure, when a first system and a second system are wireless local area network systems of different types, and the first system and the second system have an overlapping coverage area and are not synchronized, a first access point in the first system selects, from access point devices in the second system, one access point as a second access point to which the first access point is attached, and connects to the second access point in a synchronized manner to send first information to a network device in the second system. A user device in the first system selects, from the access point devices in the second system, one access point as a third access point to which the user device is attached, and connects to the third access point in a synchronized manner to send second information to the network device in the second system. In this way, it can be achieved that the first system is managed by the second system, so that the first system and the second system can be synchronized. Further, the network device (for example, an AC) determines, according to the first information and the second information, a transmission mode and a transmission bandwidth between the first access point and the user device. So that the first access point performs data transmission with the user device by using the determined transmission mode and the transmission bandwidth, thereby improving the efficiency of network resource utilization and a system throughput when wireless local area network systems of different types coexist, and also resolving the problem of cross timeslot interference that occurs when wireless local area network systems of different types coexist.

Figure 4:
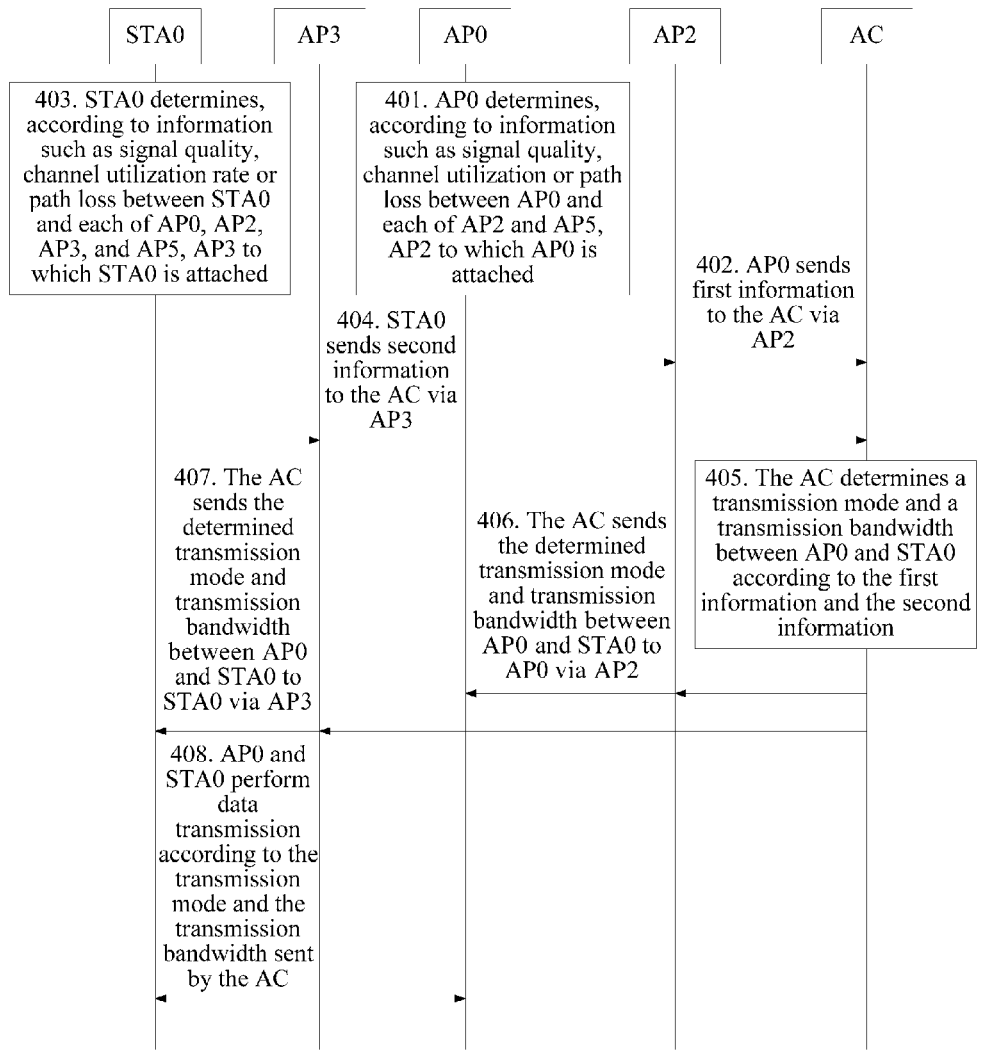
FIG. 4 is a signaling diagram of a method for controlling wireless transmission according to another embodiment of the present disclosure.
Figure 5:
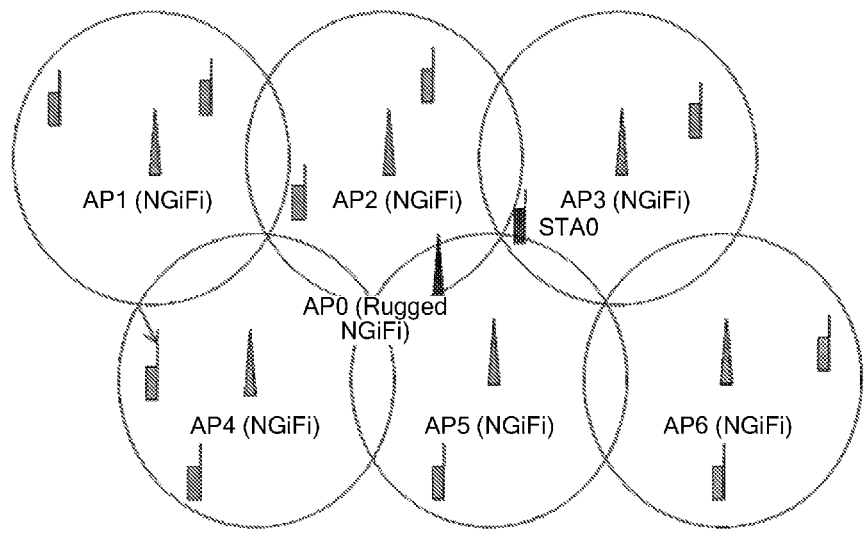
FIG. 5 is a system architecture diagram to which the method for controlling wireless transmission shown in FIG. 4 is applied.

FIG. 4 is a signaling diagram of a method for controlling wireless transmission according to another embodiment of the present disclosure, and FIG. 5 is a system architecture diagram to which the method for controlling wireless transmission shown in FIG. 4 is applied. As shown in FIG. 5, AP0 (equivalent to a first access point) and STA0 (equivalent to a user device) form an NGiFi system, which is briefly referred to as a first system, being a first-type wireless local area network system; and AP1, AP2, AP3, AP4, AP5, and AP6, and STAs served by AP1, AP2, AP3, AP4, AP5, and AP6 form another NGiFi system, which is briefly referred to as a second system, being a second-type wireless local area network system. The first system and the second system have an overlapping coverage area and are not synchronized. As shown in FIG. 5, the first system is within coverage of the second system. As shown in FIG. 4, the method for controlling wireless transmission in this embodiment may include:

401: AP0 determines, according to information such as signal quality, channel utilization rate or path loss between AP0 and each of AP2 and AP5, AP2 to which AP0 is attached.

Since the first system to which AP0 belongs and the second system to which AP2 and AP5 belong have an overlapping coverage area, when AP0 searches for a network, AP0 may find AP2 and AP5. AP0 may determine, according to information such as signal quality or channel utilization rate between AP0 and AP2 and information such as signal quality or channel utilization rate between AP0 and AP5, an AP to which AP0 is attached. For example, AP0 may determine an AP having desirable signal quality as the AP to which AP0 is attached, or determine an AP having a high channel utilization rate as the AP to which AP0 is attached. It is assumed that in this embodiment, AP0 determines AP2 as the AP to which AP0 is attached (AP2 is equivalent to a second access point).

402: AP0 sends first information to an AC via AP2.

The first information includes channel state information such as signal quality or channel utilization rate between AP0 and each of AP2 and AP5, and bandwidth requirement information of AP0.

AP0 connects to AP2 in a synchronized manner, and then sends, to the AC via AP2, the channel state information such as signal quality or channel utilization rate between AP0 and AP2, the channel state information such as signal quality or channel utilization rate between AP0 and AP5, and the bandwidth requirement information of AP0.

403: STA0 determines, according to information such as signal quality, channel utilization rate or path loss between STA0 and each of AP0, AP2, AP3, and AP5, AP3 to which STA0 is attached.

For example, when signal quality between STA0 and AP2 is the best, STA0 may determine AP2 as an AP to which STA0 is attached, and in this case, the AP to which AP0 is attached and the AP to which STA0 is attached are a same AP.

For another example, when signal quality between STA0 and AP3 is the best, STA0 may determine AP3 as an AP to which STA0 is attached, and in this case, the AP to which AP0 is attached and the AP to which STA0 is attached are not a same AP.

404: STA0 sends second information to the AC via AP3.

It is assuming that, in this embodiment, STA0 determines AP3 as the AP to which STA0 is attached. Then, STA0 sends the second information to the AC via AP3.

The second information includes channel state information such as signal quality or channel utilization rate between STA0 and each of AP0, AP2, AP3, and AP5, and bandwidth requirement information of STA0.

405: The AC determines a transmission mode and a transmission bandwidth between AP0 and STA0 according to the first information and the second information.

In an actual application, when the AC determines the transmission bandwidth between AP0 and STA0, a network load status is considered. For example, the AC determines a value of a remaining system bandwidth according to network load statuses of AP0, AP2, AP3, and AP5. Then, according to the channel quality information between AP0 and each of AP2 and AP5 and the bandwidth requirement information of AP0 that are included in the first information, the channel quality information between STA0 and each of AP0, AP2, AP3, and AP5 and the bandwidth requirement information of STA0 that are included in the second information, if the remaining system bandwidth can satisfy bandwidth requirements of AP0 and STA0, the AC directly allocates the remaining bandwidth according to the bandwidth requirement information of AP0 and the bandwidth requirement information of STA0, so as to determine the transmission bandwidth between AP0 and STA0. Otherwise, the AC allocates the remaining bandwidth in proportion to AP0 and STA0, so as to determine the transmission bandwidth between AP0 and STA0.

In this embodiment, it is assumed that the AC determines: the transmission bandwidth between AP0 and STA0 is w; an occupied bandwidth of AP0 in AP2 is w and an isolation bandwidth is w'; and an occupied bandwidth of AP0 in AP5 is w and an isolation bandwidth is w''; an occupied bandwidth of STA0 in AP2 is w and an isolation bandwidth is w'; an occupied bandwidth of STA0 in AP5 is w and an isolation bandwidth is w''; and an occupied bandwidth of STA0 in AP3 is w and an isolation bandwidth is w'''; where the isolation bandwidth exits because there must be a particular isolation band if two systems run in a frequency-division manner, or else mutual interference between the two systems is caused due to leakage of a radio frequency filter.

A weighting factor of channel quality and spectral efficiency between AP0 and STA0 for a direct mode is calculated according to a formula $M1=mcs/(3^w+w'+w''+w''')$, where mcs is a modulation and coding scheme (mcs) between AP0 and STA0 for the direct mode, and $(3^w+w'+w''+w''')$ is a system bandwidth that needs to be consumed when AP0 and STA0 perform data transmission.

A weighting factor of channel quality and spectral efficiency between AP0 and STA0 for a relay mode is calculated according to a formula $M2=(mcs1+mcs2)/4W$, where mcs1 is a modulation and coding scheme between AP0 and AP2 for the relay mode, and mcs2 is a modulation and coding scheme between AP0 and AP3 for the relay mode.

If M1 is greater than M2, it is determined that the direct mode is used between AP0 and STA0, or if M1 is less than or equal to M2, it is determined that the relay mode is used between AP0 and STA0.

406: The AC sends the determined transmission mode and transmission bandwidth between AP0 and STA0 to AP0 via AP2.

407: The AC sends the determined transmission mode and transmission bandwidth between AP0 and STA0 to STA0 via AP3.

Step 406 and step 407 may be performed simultaneously.

408: AP0 and STA0 perform data transmission according to the transmission mode and the transmission bandwidth sent by the AC.

Figure 6:
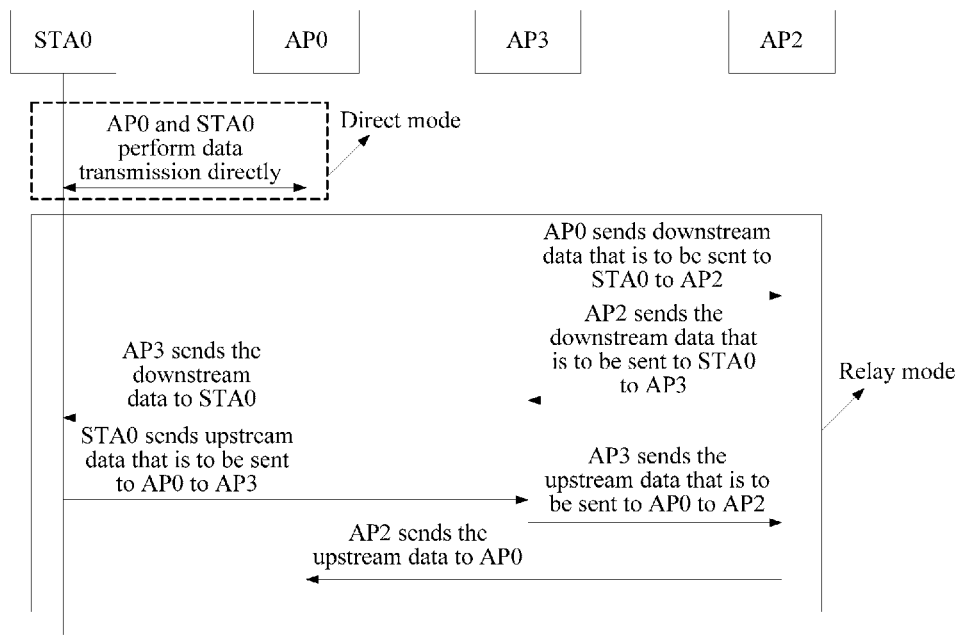
FIG. 6 is a schematic diagram of transmission for a direct mode and a relay mode between AP0 and STA0 in the embodiment shown in FIG. 4.

FIG. 6 is a schematic diagram of transmission for a direct mode and a relay mode between AP0 and STA0 in the embodiment shown in FIG. 4. As shown in FIG. 6:

When the transmission mode between AP0 and STA0 is the direct mode, AP0 and STA0 perform data transmission directly.

When the transmission mode between AP0 and STA0 is the relay mode, AP0 and STA0 perform data transmission by respectively using the APs (AP2 and AP3) to which AP0 and STA0 are attached. For example, when AP0 sends downstream data to STA0, AP0 sends the downstream data that is to be sent to STA0 to AP2, AP2 sends the downstream data that is to be sent to STA0 to AP3, and AP3 sends the downstream data to STA0. And when STA0 sends upstream data to AP0, STA0 sends the upstream data that is to be sent to AP0 to AP3, AP3 sends the upstream data that is to be sent to AP0 to AP2, and AP2 sends the upstream data to AP0.

In this embodiment of the present disclosure, when a first system to which AP0 and STA0 belong and a second system to which other APs belong are wireless local area network systems of different types that have an overlapping coverage area and are not synchronized, to resolve the problem of cross timeslot interference in existence, an AC determines a transmission mode and a transmission bandwidth between AP0 and STA0 according to first information sent by AP0 via AP2 to which AP0 connects in a synchronized manner, and second information sent by STA0 via AP3 to which STA0 connects in a synchronized manner, and sends the determined transmission mode and transmission bandwidth to both AP0 and STA0, so that AP0 and STA0 perform data transmission according to the transmission mode and the transmission bandwidth that are determined by the network device, thereby improving the efficiency of network resource utilization and a system throughput when the systems coexist.

Figure 7:
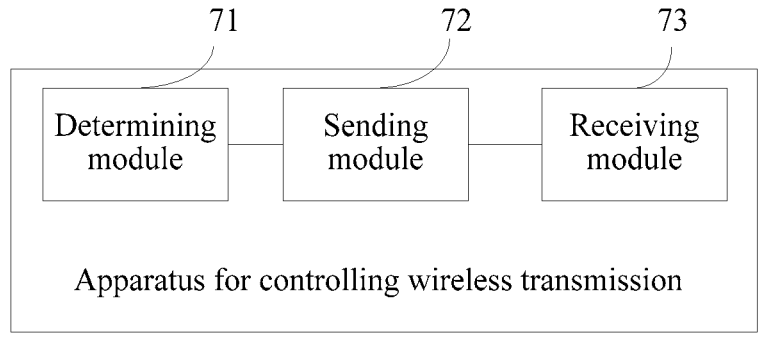
FIG. 7 is a schematic structural diagram of an apparatus for controlling wireless transmission according to another embodiment of the present disclosure.

FIG. 7 is a schematic structural diagram of an apparatus for controlling wireless transmission according to another embodiment of the present disclosure, and the apparatus is located on a first access point of a first system. As shown in FIG. 7, the apparatus includes a determining module 71, configured to select, from access points in a second system, one access point as a second access point to which the first access point is attached, where the first system and the second system have an overlapping coverage area. The apparatus further includes a sending module 72, configured to connect to the second access point, and send first information to a network device in the second system via the second access point, so that the network device determines, according to the first information and second information that is sent by a user device in the first system, a transmission mode and a transmission bandwidth between the first access point and the user device. The first information includes channel state information between the first access point and an access point in the second system, and bandwidth requirement information of the first access point. And the second information includes channel state information between the user device and the first access point, channel state information between the user device and an access point in the second system, and bandwidth requirement information of the user device.

The first system is a first-type wireless local area network system, and the second system is a second-type wireless local area network system.

The first-type wireless local area network system is a wireless local area network system without an infrastructure, and the second-type wireless local area network system is a wireless local area network system with an infrastructure.

For example, the apparatus further includes a receiving module 73, configured to receive, via the second access point, the transmission mode and the transmission bandwidth sent by the network device, where the transmission mode includes a direct mode or a relay mode. If the transmission mode is the direct mode, the sending module 72 is configured to perform data transmission directly with the user device by using the transmission bandwidth. If the transmission mode is the relay mode, the sending module 72 is configured to perform data transmission with the user device via the second access point and a third access point to which the user device is attached.

The second access point and the third access point may be the same access point, or the second access point and the third access point may be two different access points.

In this embodiment of the present disclosure, when a first system and a second system are wireless local area network systems of different types, and the first system and the second system have an overlapping coverage area and are not synchronized, a first access point in the first system selects, from access point devices in the second system, one access point as a second access point to which the first access point is attached, and connects to the second access point in a synchronized manner to send first information to a network device in the second system. In this way, it can be achieved that the first system is managed by the second system, so that the first system and the second system can be synchronized. Further, the network device in the second system may be used to determine, according to the first information and second information that is sent by a user device in the first system via an access point to which the user device is attached, a transmission mode and a transmission bandwidth between the first access point and the user device, so that the first access point performs data transmission with the user device by using the transmission mode and the transmission bandwidth that are determined by the network device, thereby improving the efficiency of network resource utilization and a system throughput when wireless local area network systems of different types coexist, and also resolving the problem of cross timeslot interference that occurs when wireless local area network systems of different types coexist.

Figure 8:
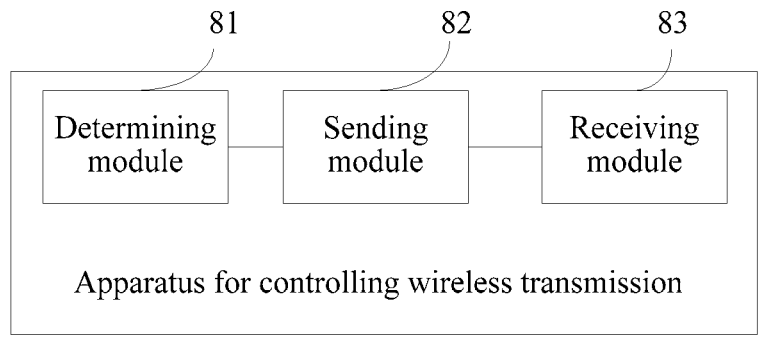
FIG. 8 is a schematic structural diagram of an apparatus for controlling wireless transmission according to another embodiment of the present disclosure.

FIG. 8 is a schematic structural diagram of an apparatus for controlling wireless transmission according to another embodiment of the present disclosure, and the apparatus is located on a user device of a first system. As shown in FIG. 8, the apparatus includes a determining module 81, configured to select, from access points in a second system, one access point as a third access point to which the user device is attached, where the first system and the second system have an overlapping coverage area. The apparatus further includes a sending module 82, configured to connect to the third access point, and send second information to a network device in the second system via the third access point, so that the network device determines, according to the second information and first information that is sent by a first access point in the first system, a transmission mode and a transmission bandwidth between the first access point and the user device. The second information includes channel state information between the user device and the first access point, channel state information between the user device and an access point in the second system, and bandwidth requirement information of the user device. The first information includes channel state information between the first access point and an access point in the second system, and bandwidth requirement information of the first access point.

The first system is a first-type wireless local area network system, and the second system is a second-type wireless local area network system.

The first-type wireless local area network system is a wireless local area network system without an infrastructure, and the second-type wireless local area network system is a wireless local area network system with an infrastructure.

For example, the apparatus further includes a receiving module 83, configured to receive, via the third access point, the determined transmission mode and transmission bandwidth sent by the network device, where the transmission mode includes a direct mode or a relay mode. If the transmission mode is the direct mode, the sending module 82 is configured to perform data transmission directly with the first access point by using the transmission bandwidth. If the transmission mode is the relay mode, the sending module 82 is configured to perform data transmission with the first access point via the third access point and a second access point to which the first access point is attached.

The second access point and the third access point may be the same access point, or the second access point and the third access point may be two different access points.

In this embodiment of the present disclosure, when a first system and a second system are wireless local area network systems of different types, and the first system and the second system have an overlapping coverage area and are not synchronized, a user device in the first system selects, from access point devices in the second system, one access point as a third access point to which the user device is attached, and connects to the third access point in a synchronized manner to send second information to a network device in the second system. In this way, it can be achieved that the first system is managed by the second system, so that the first system and the second system can be synchronized. Further, the network device in the second system may be used to determine, according to the second information and first information that is sent by a first access point in the first system via an access point to which the first access point is attached, a transmission mode and a transmission bandwidth between the first access point and the user device, so that the user device performs data transmission with the first access point by using the transmission mode and the transmission bandwidth that are determined by the network device, thereby improving the efficiency of network resource utilization and a system throughput when wireless local area network systems of different types coexist, and also resolving the problem of cross timeslot interference that occurs when wireless local area network systems of different types coexist.

Figure 9:
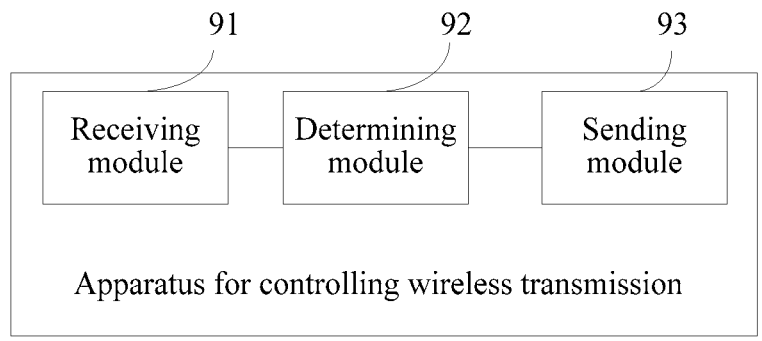
FIG. 9 is a schematic structural diagram of an apparatus for controlling wireless transmission according to another embodiment of the present disclosure.

FIG. 9 is a schematic structural diagram of an apparatus for controlling wireless transmission according to another embodiment of the present disclosure, and the apparatus is located on a network device of a second system. As shown in FIG. 9, the apparatus includes a receiving module 91, configured to receive first information sent by a first access point in a first system. The first information includes channel state information between the first access point and an access point in the second system and bandwidth requirement information of the first access point, and the first system and the second system have an overlapping coverage area. The receiving module 91 is further configured to receive second information sent by a user device in the first system, where the second information includes channel state information between the first access point and the user device, channel state information between an access point in the second system and the user device, and bandwidth requirement information of the user device. The apparatus further includes a determining module 92, configured to determine a transmission mode and a transmission bandwidth between the first access point and the user device according to the first information and the second information.

For example, the receiving module 91 is configured to receive, via a second access point device in the second system, the first information sent by the first access point.

The second access point is an access point, to which the first access point is attached, selected by the first access point from access points in the second system.

For example, the receiving module 91 is configured to receive, via a third access point device in the second system, the second information sent by the user device.

The third access point is an access point, to which the user device is attached, selected by the user device from access points in the second system.

The first system is a first-type wireless local area network system, and the second system is a second-type wireless local area network system.

The first-type wireless local area network system is a wireless local area network system without an infrastructure, and the second-type wireless local area network system is a wireless local area network system with an infrastructure.

For example, the determining module 92 is configured to determine the transmission bandwidth between the first access point and the user device according to the first information and the second information. According to the transmission bandwidth between the first access point and the user device, the determining module 92 may determine a bandwidth occupied by the first access point in an access point in the second system and an isolation bandwidth and determine a bandwidth occupied by the user device in an access point in the second system and an isolation bandwidth. And the determining module 92 may further determine the transmission mode between the first access point and the user device according to the bandwidth occupied by the first access point in an access point in the second system and the isolation bandwidth, and the bandwidth occupied by the user device in an access point in the second system and the isolation bandwidth, where the transmission mode includes a direct mode or a relay mode.

For example, the determining module 92 is further configured to: determine a first factor according to the transmission bandwidth between the first access point and the user device, the bandwidth occupied by the first access point in an access point in the second system and the isolation bandwidth, the bandwidth occupied by the user device in an access point in the second system and the isolation bandwidth, and a modulation and coding scheme between the first access point and the user device for the direct mode. The first factor is a weighting factor of channel quality and spectral efficiency between the first access point and the user device for the direct mode. The determining module 92 may determine a second factor according to the transmission bandwidth between the first access point and the user device, a modulation and coding scheme between the first access point and the second access point for the relay mode, and a modulation and coding scheme between the user device and the third access point for the relay mode. The second factor is a weighting factor of channel quality and spectral efficiency between the first access point and the user device for the relay mode. If the first factor is greater than the second factor, determine that the transmission mode between the first access point and the user device is the direct mode. If the first factor is less than or equal to the second factor, determine that the transmission mode between the first access point and the user device is the relay mode.

For example, the apparatus further includes a sending module 93, configured to send the determined transmission mode and transmission bandwidth to the first access point via the second access point, and send the determined transmission mode and transmission bandwidth to the user device via the third access point, so that the first access point and the user device perform data transmission by using the determined transmission mode and transmission bandwidth.

The second access point and the third access point may be the same access point, or the second access point and the third access point may be two different access points.

In this embodiment of the present disclosure, when a first system and a second system are wireless local area network systems of different types, and the first system and the second system have an overlapping coverage area and are not synchronized, a first access point in the first system selects, from access point devices in the second system, one access point as a second access point to which the first access point is attached, and connects to the second access point in a synchronized manner to send first information to a network device in the second system; a user device in the first system selects, from the access point devices in the second system, one access point as a third access point to which the user device is attached, and connects to the third access point in a synchronized manner to send second information to the network device in the second system. In this way, it can be achieved that the first system is managed by the second system, so that the first system and the second system can be synchronized. Further, the network device (for example, an AC) determines, according to the first information and the second information, a transmission mode and a transmission bandwidth between the first access point and the user device, so that the first access point performs data transmission with the user device by using the transmission mode and the transmission bandwidth that are determined by the network device, thereby improving the efficiency of network resource utilization and a system throughput when wireless local area network systems of different types coexist, and also resolving the problem of cross timeslot interference that occurs when wireless local area network systems of different types coexist.

Figure 10:
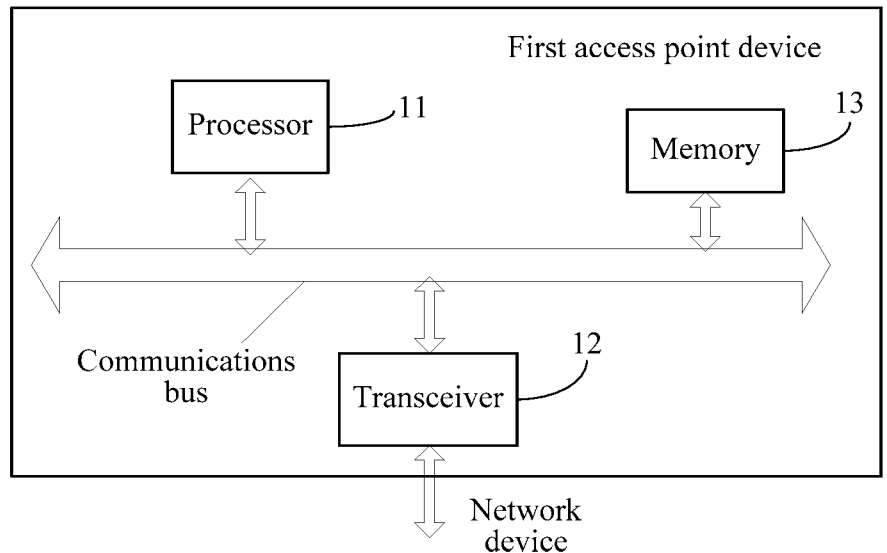
FIG. 10 is a schematic structural diagram of a first access point according to another embodiment of the present disclosure.

FIG. 10 is a schematic structural diagram of a first access point of a first system according to another embodiment of the present disclosure. As shown in FIG. 10, the first access point includes a processor 11, configured to select, from access points in a second system, one access point as a second access point to which the first access point is attached, where the first system and the second system have an overlapping coverage area. The first access point further includes a transceiver 12, configured to connect to the second access point, and send first information to a network device in the second system via the second access point, so that the network device determines, according to the first information and second information that is sent by a user device in the first system, a transmission mode and a transmission bandwidth between the first access point and the user device. The first information includes channel state information between the first access point and an access point in the second system, and bandwidth requirement information of the first access point. The second information includes channel state information between the user device and the first access point, channel state information between the user device and an access point in the second system, and bandwidth requirement information of the user device.

The first system is a first-type wireless local area network system, and the second system is a second-type wireless local area network system.

The first-type wireless local area network system is a wireless local area network system without an infrastructure, and the second-type wireless local area network system is a wireless local area network system with an infrastructure.

For example, the transceiver 12 is further configured to receive, via the second access point, the transmission mode and the transmission bandwidth sent by the network device, where the transmission mode includes a direct mode or a relay mode. If the transmission mode is the direct mode, the transceiver 12 is configured to perform data transmission directly with the user device by using the transmission bandwidth. If the transmission mode is the relay mode, the transceiver 12 is configured to perform data transmission with the user device via the second access point and a third access point to which the user device is attached.

The second access point and the third access point may be same access point, or the second access point and the third access point may be two different access points.

For example, the first access point further includes a memory 13. The memory 13 stores an instruction that implements the forgoing method for controlling wireless transmission. The processor 11 can invoke the instruction stored in the memory 13 to execute the foregoing method for controlling wireless transmission, where the processor 11, the transceiver 12, and the memory 13 are connected by using a communications bus.

In this embodiment of the present disclosure, when a first system and a second system are wireless local area network systems of different types, and the first system and the second system have an overlapping coverage area and are not synchronized, a first access point in the first system selects, from access point devices in the second system, one access point as a second access point to which the first access point is attached, and connects to the second access point in a synchronized manner to send first information to a network device in the second system. In this way, it can be achieved that the first system is managed by the second system, so that the first system and the second system can be synchronized. Further, the network device in the second system may be used to determine, according to the first information and second information that is sent by a user device in the first system via an access point to which the user device is attached, a transmission mode and a transmission bandwidth between the first access point and the user device, so that the first access point performs data transmission with the user device by using the transmission mode and the transmission bandwidth that are determined by the network device, thereby improving the efficiency of network resource utilization and a system throughput when wireless local area network systems of different types coexist, and also resolving the problem of cross timeslot interference that occurs when wireless local area network systems of different types coexist.

Figure 11:
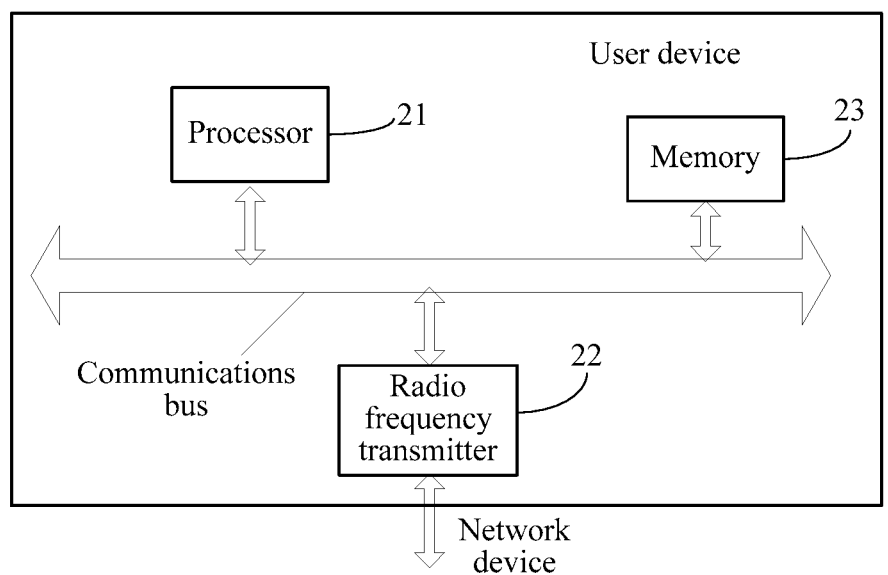
FIG. 11 is a schematic structural diagram of a user device according to another embodiment of the present disclosure.

FIG. 11 is a schematic structural diagram of a user device of a first system according to another embodiment of the present disclosure. As shown in FIG. 11, the user device includes a processor 21, configured to select, from access points in a second system, one access point as a third access point to which the user device is attached, where the first system and the second system have an overlapping coverage area. The user device further includes a radio frequency transmitter 22, configured to connect to the third access point, and send second information to a network device in the second system via the third access point, so that the network device determines, according to the second information and first information that is sent by a first access point in the first system, a transmission mode and a transmission bandwidth between the first access point and the user device. The second information includes channel state information between the user device and the first access point, channel state information between the user device and an access point in the second system, and bandwidth requirement information of the user device. The first information includes channel state information between the first access point and an access point in the second system, and bandwidth requirement information of the first access point.

The first system is a first-type wireless local area network system, and the second system is a second-type wireless local area network system.

The first-type wireless local area network system is a wireless local area network system without an infrastructure, and the second-type wireless local area network system is a wireless local area network system with an infrastructure.

For example, the radio frequency transmitter 22 is further configured to receive, via the third access point, the determined transmission mode and transmission bandwidth sent by the network device, where the transmission mode includes a direct mode or a relay mode. If the transmission mode is the direct mode, the radio frequency transmitter 22 is configured to perform data transmission directly with the first access point by using the transmission bandwidth. If the transmission mode is the relay mode, the radio frequency transmitter 22 is configured to perform data transmission with the first access point via the third access point and a second access point to which the first access point is attached.

The second access point and the third access point may be same access point, or the second access point and the third access point may be two different access points.

For example, the user device further includes a memory 23. The memory 23 stores an instruction that implements the forgoing method for controlling wireless transmission. The processor 21 can invoke the instruction stored in the memory 23 to execute the foregoing method for controlling wireless transmission, where the processor 21, the radio frequency transmitter 22, and the memory 23 are connected by using a communications bus.

In this embodiment of the present disclosure, when a first system and a second system are wireless local area network systems of different types, and the first system and the second system have an overlapping coverage area and are not synchronized, a user device in the first system selects, from access point devices in the second system, one access point as a third access point to which the user device is attached, and connects to the third access point in a synchronized manner to send second information to a network device in the second system. In this way, it can be achieved that the first system is managed by the second system, so that the first system and the second system can be synchronized. Further, the network device in the second system may be used to determine, according to the second information and first information that is sent by a first access point in the first system via an access point to which the first access point is attached, a transmission mode and a transmission bandwidth between the first access point and the user device, so that the user device performs data transmission with the first access point by using the transmission mode and the transmission bandwidth that are determined by the network device, thereby improving the efficiency of network resource utilization and a system throughput when wireless local area network systems of different types coexist, and also resolving the problem of cross timeslot interference that occurs when wireless local area network systems of different types coexist.

Figure 12:
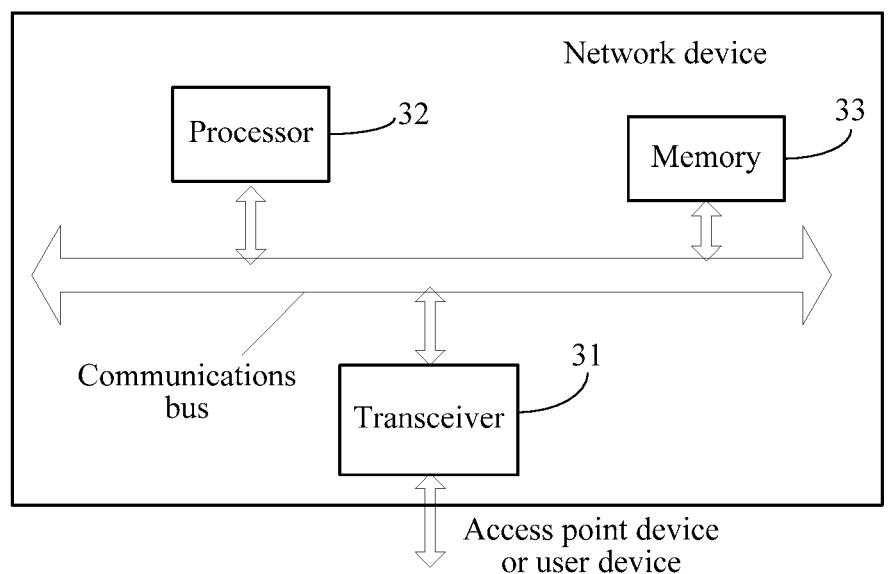
FIG. 12 is a schematic structural diagram of a network device according to another embodiment of the present disclosure.

FIG. 12 is a schematic structural diagram of a network device of a second system according to another embodiment of the present disclosure. As shown in FIG. 12, the network device includes a transceiver 31, configured to receive first information sent by a first access point in a first system, where the first information includes channel state information between the first access point and an access point in the second system, and bandwidth requirement information of the first access point, and the first system and the second system have an overlapping coverage area. The transceiver 31 is further configured to receive second information sent by a user device in the first system, where the second information includes channel state information between the first access point and the user device, channel state information between an access point in the second system and the user device, and bandwidth requirement information of the user device. The network device further includes a processor 32, configured to determine a transmission mode and a transmission bandwidth between the first access point and the user device according to the first information and the second information.

For example, the transceiver 31 is configured to receive, via a second access point device in the second system, the first information sent by the first access point.

The second access point is an access point, to which the first access point is attached, selected by the first access point from access points in the second system.

For example, the transceiver 31 is configured to receive, via a third access point device in the second system, the second information sent by the user device.

The third access point is an access point, to which the user device is attached, selected by the user device from access points in the second system.

The first system is a first-type wireless local area network system, and the second system is a second-type wireless local area network system.

The first-type wireless local area network system is a wireless local area network system without an infrastructure, and the second-type wireless local area network system is a wireless local area network system with an infrastructure.

For example, the processor 32 is configured to determine the transmission bandwidth between the first access point and the user device according to the first information and the second information. According to the transmission bandwidth between the first access point and the user device, the processor 32 may determine a bandwidth occupied by the first access point in an access point in the second system and an isolation bandwidth, and determine a bandwidth occupied by the user device in an access point in the second system and an isolation bandwidth. And the processor 32 may further determine the transmission mode between the first access point and the user device according to the bandwidth occupied by the first access point in an access point in the second system and the isolation bandwidth, and the bandwidth occupied by the user device in an access point in the second system and the isolation bandwidth, where the transmission mode includes a direct mode or a relay mode.

For example, the processor 32 is further configured to: determine a first factor according to the transmission bandwidth between the first access point and the user device, the bandwidth occupied by the first access point in an access point in the second system and the isolation bandwidth, the bandwidth occupied by the user device in an access point in the second system and the isolation bandwidth, and a modulation and coding scheme between the first access point and the user device for the direct mode. The first factor is a weighting factor of channel quality and spectral efficiency between the first access point and the user device for the direct mode. The processor 32 may determine a second factor according to the transmission bandwidth between the first access point and the user device, a modulation and coding scheme between the first access point and the second access point for the relay mode, and a modulation and coding scheme between the user device and the third access point for the relay mode. The second factor is a weighting factor of channel quality and spectral efficiency between the first access point and the user device for the relay mode. If the first factor is greater than the second factor, determine that the transmission mode between the first access point and the user device is the direct mode. If the first factor is less than or equal to the second factor, determine that the transmission mode between the first access point and the user device is the relay mode.

For example, the transceiver 31 is further configured to send the determined transmission mode and transmission bandwidth to the first access point via the second access point, and send the determined transmission mode and transmission bandwidth to the user device via the third access point, so that the first access point and the user device perform data transmission by using the determined transmission mode and transmission bandwidth.

The second access point and the third access point may be the same access point; or the second access point and the third access point may be two different access points.

For example, the network device further includes a memory 33. The memory 33 stores an instruction that implements the forgoing method for controlling wireless transmission. The processor 32 can invoke the instruction stored in the memory 33 to execute the foregoing method for controlling wireless transmission, where the transceiver 31, the processor 32, and the memory 33 are connected by using a communications bus.

In this embodiment of the present disclosure, when a first system and a second system are wireless local area network systems of different types, and the first system and the second system have an overlapping coverage area and are not synchronized, a first access point in the first system selects, from access point devices in the second system, one access point as a second access point to which the first access point is attached, and connects to the second access point in a synchronized manner to send first information to a network device in the second system; a user device in the first system selects, from the access point devices in the second system, one access point as a third access point to which the user device is attached, and connects to the third access point in a synchronized manner to send second information to the network device in the second system. In this way, it can be achieved that the first system is managed by the second system, so that the first system and the second system can be synchronized. Further, the network device (for example, an AC) determines, according to the first information and the second information, a transmission mode and a transmission bandwidth between the first access point and the user device, so that the first access point performs data transmission with the user device by using the transmission mode and the transmission bandwidth that are determined by the network device, thereby improving the efficiency of network resource utilization and a system throughput when wireless local area network systems of different types coexist, and also resolving the problem of cross timeslot interference that occurs when wireless local area network systems of different types coexist.

Figure 13:
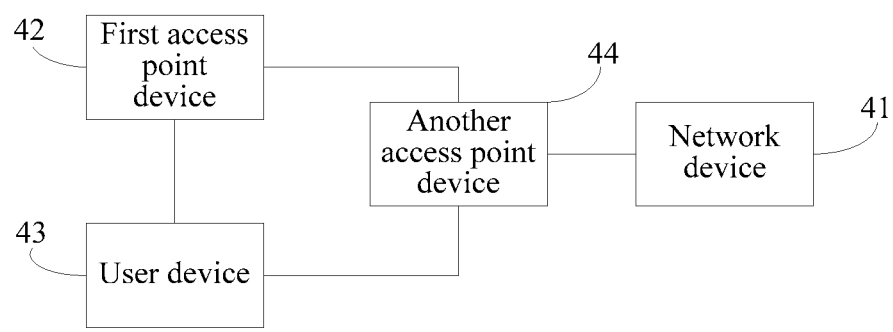
FIG. 13 is a schematic structural diagram of a system for controlling wireless transmission according to another embodiment of the present disclosure.

FIG. 13 is a schematic structural diagram of a system for controlling wireless transmission according to another embodiment of the present disclosure. As shown in FIG. 13, the system includes: a network device 41, an access point 42, and a user device 43. The access point 42 and the user device 43 are located in a first system, where the first system is a first-type wireless local area network system.

The network device 41 includes the apparatus for controlling wireless transmission shown in FIG. 9 or FIG. 12.

The access point 42 includes the apparatus for controlling wireless transmission shown in FIG. 7 or FIG. 10.

The user device 43 includes the apparatus for controlling wireless transmission shown in FIG. 8 or FIG. 11.

According to a system architecture diagram shown in FIG. 13, the system further includes at least one other access point 44, the other access point 44 and the network device 41 are located in a second system, where the second system is a second-type wireless local area network system.

The first system and the second system have an overlapping coverage area.

The access point 42 may be attached to another access point 44, and the user device 43 may also be attached to another access point 44.

When the system includes more than one other access point 44, the access point 42 may determine, according to channel quality information between the access point 42 and each of the other access points, the another access point to which the access point 42 is attached; and the user device 33 may also determine, according to channel quality information between the user device 43 and each of other access points, the another access point to which the user device 43 is attached.

The another access point to which the access point 42 is attached may be the same as or different to the another access point to which the user device 43 is attached.

The another access point is configured to receive first information sent by the access point 42, and send the first information to the network device 41.

The another access point is configured to receive second information sent by the user device 43, and send the second information to the network device 41.

The another access point is configured to send, to the access point 42, a transmission mode and a transmission bandwidth, between the access point 42 and the user device 43, determined by the network device 41.

The another access point is configured to send, to the user device 43, the transmission mode and the transmission bandwidth, between the access point 42 and the user device 43, determined by the network device 41.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a removable hard disk, a read-only memory (ROM), a random access memory (RAM), a magnetic disk, or an optical disc.

It should be noted in the end that: the foregoing embodiments are merely intended to describe the technical solutions of the present disclosure, but not to limit the present application. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present application.

What is claimed is:

1. A method for controlling wireless transmission, the method comprising:
    selecting, by a first access point in a first system, a second access point in a second system, wherein the first and second systems have an overlapping coverage area;
    connecting, by the first access point, to the second access point; and
    sending, by the first access point, first information to a network device in the second system via the second access point, so that the network device determines, according to the first information and second information sent by a user device in the first system, a transmission mode and a transmission bandwidth between the first access point and the user device, thereby providing synchronization of the first and second systems, wherein
    the first information comprises:
        a) channel state information between the first access point and an access point in the second system, and
        b) bandwidth requirement information of the first access point, and
    the second information comprises:
        a) channel state information between the user device and the first access point,
        b) channel state information between the user device and the access point in the second system, and
        c) bandwidth requirement information of the user device,
    where the access point in the second system can be the second access point or a different access point in the second system.

2. The method according to claim 1, wherein:
    the first system is a first-type wireless local area network system, and the second system is a second-type wireless local area network system; and
    the first system is a wireless local area network system without an infrastructure, and the second system is a wireless local area network system with an infrastructure.

3. The method according to claim 1, after connecting to the second access point, and sending first information to the network device in the second system via the second access point, the method further comprising:
    receiving, by the first access point via the second access point, the transmission mode and the transmission bandwidth sent by the network device; and
    when the transmission mode is direct mode, performing, by the first access point, data transmission directly with the user device by using the transmission bandwidth; or
    when the transmission mode is relay mode, performing, by the first access point, data transmission with the user device via the second access point and a third access point to which the user device is attached.

4. A method for controlling wireless transmission, the method comprising:
    determining, by a user device in a first system, a third access point in a second system to which the user device is attached, wherein the first system and the second system have an overlapping coverage area; and
    connecting, by the user device, to the third access point, and sending second information to a network device in the second system via the third access point, so that the network device determines, according to the second information and first information sent by a first access point in the first system, a transmission mode and a transmission bandwidth between the first access point and the user device, wherein
    the second information comprises:
        a) channel state information between the user device and the first access point,
        b) channel state information between the user device and an access point in the second system, and
        c) bandwidth requirement information of the user device, and
    the first information comprises:
        a) channel state information between the first access point and the access point in the second system, and
        b) bandwidth requirement information of the first access point.

5. The method according to claim 4, after connecting to the third access point, and sending second information to a network device in the second system via the third access point, the method further comprising:
    receiving, by the user device via the third access point, the determined transmission mode and transmission bandwidth sent by the network device; and
    when the transmission mode is direct mode, performing, by the user device, data transmission directly with the first access point by using the transmission bandwidth; or
    when the transmission mode is relay mode, performing, by the user device, data transmission with the first access point via the third access point and a second access point to which the first access point is attached.

6. A method for controlling wireless transmission, the method comprising:
    receiving, by a network device in a second wireless communications system, first information sent by a first access point in a first wireless communications system, wherein the first information comprises:
        a) channel state information between the first access point in the first system and a second access point in the second system, and
        b) bandwidth requirement information of the first access point, and the first and second systems have an overlapping coverage area;
    receiving, by the network device, second information sent by a user device in the first system, wherein the second information comprises:
        a) channel state information between the first access point and the user device,
        b) channel state information between an access point in the second system and the user device, where the access point in the second system can be the second access point or a different access point in the second system; and
        c) bandwidth requirement information of the user device; and
    determining, by the network device, a transmission mode and a transmission bandwidth between the first access point and the user device according to the first information and the second information, thereby providing synchronization of the first and second systems.

7. The method according to claim 6, wherein receiving first information sent by a first access point in a first system comprises:

receiving, by the network device via the second access point device in the second system, the first information sent by the first access point, wherein the second access point is attached to the first access point after being selected by the first access point.

8. The method according to claim 6, wherein receiving the second information sent by a user device in the first system comprises:
receiving, by the network device via a third access point device in the second system, the second information sent by the user device, wherein the third access point is attached to the user device after being selected by the user device.

9. The method according to claim 6, wherein determining the transmission mode and bandwidth between the first access point and the user device according to the first information and the second information comprises:
determining, by the network device, the transmission bandwidth between the first access point and the user device according to the first information and the second information;
according to the transmission bandwidth between the first access point and the user device,
a) determining a bandwidth occupied by the first access point in an access point in the second system and an isolation bandwidth, and
b) determining a bandwidth occupied by the user device in the access point in the second system and an isolation bandwidth; and
determining the transmission mode between the first access point and the user device according to,
a) the bandwidth occupied by the first access point in an access point in the second system and the isolation bandwidth, and
b) the bandwidth occupied by the user device in the access point in the second system and the isolation bandwidth,
wherein the transmission mode is a direct mode or a relay mode.

10. The method according claim 9, after determining the transmission mode and bandwidth between the first access point and the user device according to the first and second information, comprising:
sending, by the network device, the determined transmission mode and transmission bandwidth to the first access point via the second access point, and
sending, by the network device, the determined transmission mode and transmission bandwidth to the user device via the third access point, so that the first access point and the user device perform data transmission by using the determined transmission mode and transmission bandwidth.

11. An apparatus for controlling wireless transmission, which is located on a first access point of a first system, the apparatus comprising:
a processor in communication with a non-transitory memory storing instructions for execution by the processor such that, when the instructions are executed by the processor, the processor is configured to select, from access points in a second system, second access point to which the first access point is attached, wherein the first and second systems have an overlapping coverage area; and
a transceiver configured to connect to the second access point, and send first information to a network device in the second system via the second access point, so that the network device determines, according to the first information and second information that is sent by a user device in the first system, a transmission mode and a transmission bandwidth between the first access point and the user device, wherein
the first information comprises:
a) channel state information between the first access point and an access point in the second system, and
b) bandwidth requirement information of the first access point, and
the second information comprises:
a) channel state information between the user device and the first access point,
b) channel state information between the user device and the access point in the second system, and
c) bandwidth requirement information of the user device,
where the access point in the second system can be the second access point or a different access point in the second system.

12. The apparatus according to claim 11, wherein:
the first system is a wireless local area network system without an infrastructure, and the second system is a wireless local area network system with an infrastructure.

13. The apparatus according to claim 11, wherein the transceiver is further configured to:
receive, via the second access point, the transmission mode and the transmission bandwidth sent by the network device; and
when the transmission mode is direct mode, perform data transmission directly with the user device by using the transmission bandwidth; or
when the transmission mode is relay mode, perform data transmission with the user device via the second access point and a third access point to which the user device is attached.

14. An apparatus for controlling wireless transmission, which is located on a user device of a first system, the apparatus comprising:
a processor in communication with a non-transitory memory storing instructions for execution by the processor such that, when the instructions are executed by the processor, the processor is configured to select, from access points in a second system, a third access point to which the user device is attached, wherein the first and second systems have an overlapping coverage area; and
a transceiver configured to connect to the third access point, and send second information to a network device in the second system via the third access point, so that the network device determines, according to the second information and first information that is sent by a first access point in the first system, a transmission mode and a transmission bandwidth between the first access point and the user device, wherein
the second information comprises:
a) channel state information between the user device and the first access point,
b) channel state information between the user device and an access point in the second system, and
c) bandwidth requirement information of the user device, and
the first information comprises:
a) channel state information between the first access point and the access point in the second system, and
b) bandwidth requirement information of the first access point, where the access point in the second system can be the second access point or a different access point in the second system.

15. The apparatus according to claim 14, wherein the transceiver is further configured to:
receive, via the third access point, the determined transmission mode and transmission bandwidth sent by the network device; and
when the transmission mode is direct mode, perform data transmission directly with the first access point by using the transmission bandwidth; or
when the transmission mode is relay mode, perform data transmission with the first access point via the third access point and a second access point to which the first access point is attached.

16. An apparatus for controlling wireless transmission, which is located on a network device of a second system, the apparatus comprising:
a transceiver configured to:
receive first information sent by a first access point in a first system, wherein the first information comprises:
a) channel state information between the first access point and a second access point in the second system, and
b) bandwidth requirement information of the first access point, and the first system and the second system have an overlapping coverage area;
receive second information sent by a user device in the first system, wherein the second information comprises:
a) channel state information between the first access point and the user device,
b) channel state information between an access point in the second system and the user device, where the access point in the second system can be the second access point or a different access point in the second system, and
c) bandwidth requirement information of the user device; and
a processor in communication with a non-transitory memory storing instructions for execution by the processor such that, when the instructions are executed by the processor, the processor is configured to determine a transmission mode and a transmission bandwidth between the first access point and the user device according to the first information and the second information.

17. The apparatus according to claim 16, wherein the transceiver is configured to receive, via the second access point device in the second system, the first information sent by the first access point, wherein
the second access point is an access point, to which the first access point is attached after being selected by the first access point from access points in the second system.

18. The apparatus according to claim 16, wherein the transceiver is configured to receive, via a third access point device in the second system, the second information sent by the user device, wherein
the third access point is an access point, to which the user device is attached after being selected by the user device from access points in the second system.

19. The apparatus according to claim 16, wherein the processor is further configured to:
determine the transmission bandwidth between the first access point and the user device according to the first information and the second information;
according to the transmission bandwidth between the first access point and the user device,
a) determine a bandwidth occupied by the first access point in the access point in the second system and an isolation bandwidth, and
b) determine a bandwidth occupied by the user device in the access point in the second system and the isolation bandwidth; and
determine the transmission mode between the first access point and the user device according to,
a) the bandwidth occupied by the first access point in an access point in the second system and the isolation bandwidth, and
b) the bandwidth occupied by the user device in an access point in the second system and the isolation bandwidth,
wherein the transmission mode is a direct mode or a relay mode.

20. The apparatus according to claim 19, wherein the transceiver is further configured to:
send the determined transmission mode and transmission bandwidth to the first access point via the second access point; and
send the determined transmission mode and transmission bandwidth to the user device via the third access point, so that the first access point and the user device perform data transmission by using the determined transmission mode and transmission bandwidth.

* * * * *